UNITED STATES PATENT OFFICE.

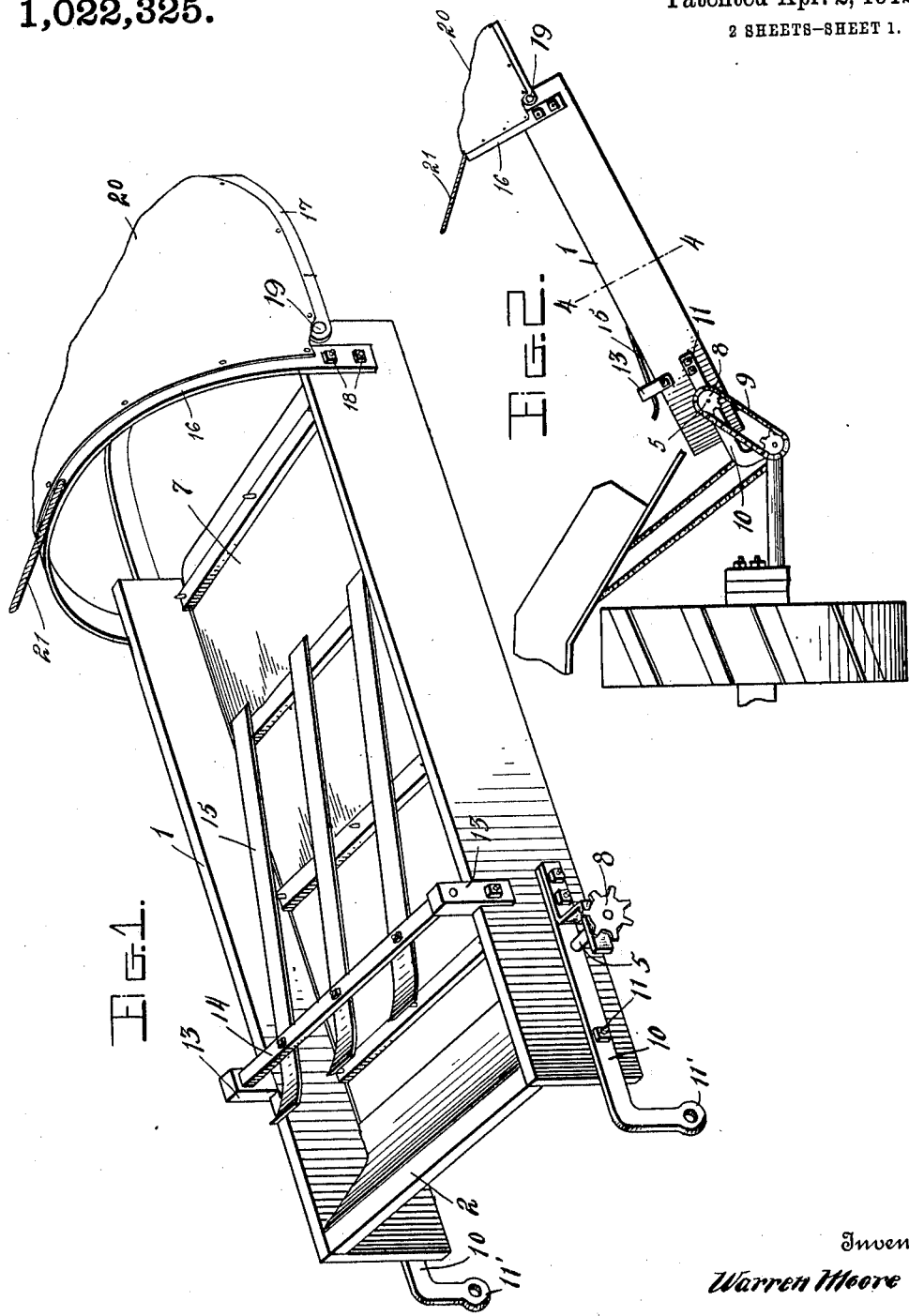

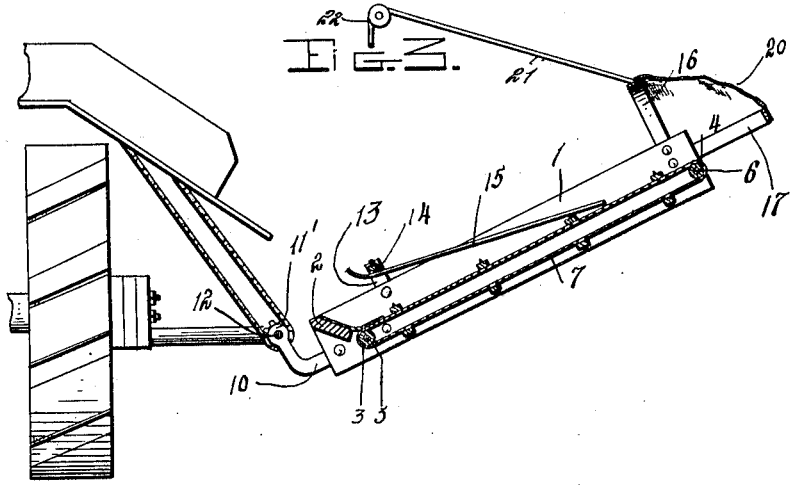
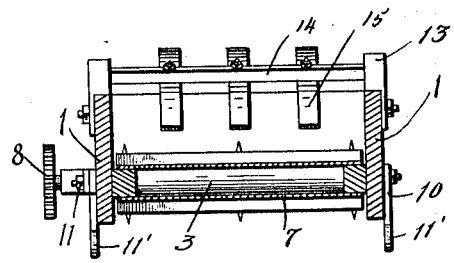
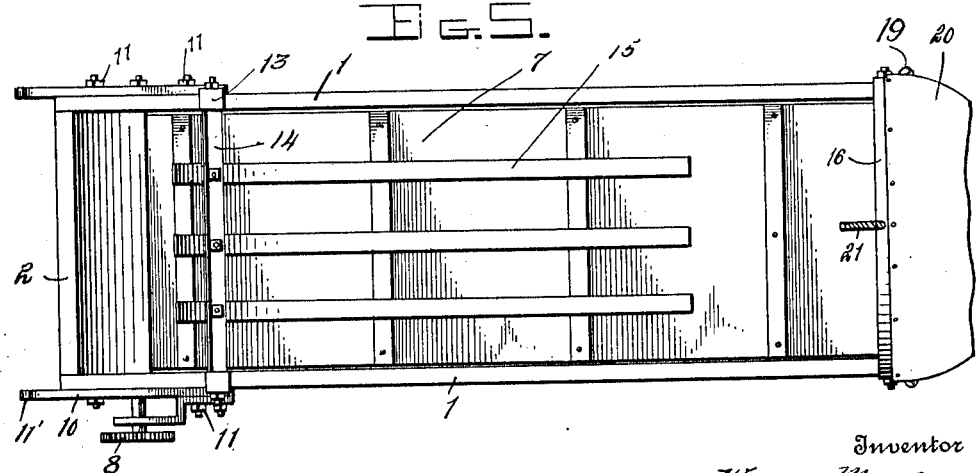

WARREN MOORE, OF LOOMIS, NEBRASKA.

HARVESTER ATTACHMENT.

1,022,325. Specification of Letters Patent. Patented Apr. 2, 1912.

Application filed October 7, 1911. Serial No. 653,364.

*To all whom it may concern:*

Be it known that I, WARREN MOORE, a citizen of the United States, residing at Loomis, in the county of Phelps and State of Nebraska, have invented new and useful Improvements in Harvester Attachments, of which the following is a specification.

This invention relates to attachments for harvesting machines and especially for self-binding harvesters, and it has for its object to produce a simple elevator attachment whereby bundles of grain may be elevated as they come from the binder platform and be subsequently dropped into a receiving receptacle, such as the box of a wagon driven alongside the harvester.

A further object of the invention is to so construct the improved attachment that by simply elevating the same it may be supported in a position suitable for conveying headed grain.

A further object of the invention is to simplify and improve the means whereby the device is connected with the harvester.

A still further object of the invention is to simplify and improve the general construction and operation of the improved attachment.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings—Figure 1 is a perspective view of the improved harvester attachment detached. Fig. 2 is a side elevation showing the attachment applied to a harvester, only a portion of the latter being shown, in position for conveying headed grain. Fig. 3 is a vertical sectional view taken longitudinally through the attachment and showing the same mounted in position for conveying bundles of grain. Fig. 4 is a transverse sectional view of the device taken on the line 4—4 in Fig. 2. Fig. 5 is a top plan view of the attachment.

Corresponding parts in the several figures are denoted by like characters of reference.

The improved harvester attachment consists of a frame or casing composed of side members 1, 1 which are connected and spaced apart by means including a cross bar 2 and rollers 3 and 4, said rollers being supported or mounted upon shafts 5 and 6, the former of which is located adjacent to the cross bar 2 at the inner end of the frame, the inner end being that which in practice is attached to or connected with the frame of the harvester. The rollers 3 and 4 support an endless carrier 7, and the roller carrying shaft 5 is equipped with a sprocket wheel 8 adapted to receive motion by means of a chain or link belt 9 from a driven shaft of the harvester with which the device is in practice connected.

The side members 1, 1 of the frame or casing are provided with attaching means consisting of angular or L-shaped brackets 10 which are detachably secured upon said side members 1, 1 by means of screws or bolts 11. These L-shaped attaching brackets may be reversed or inverted so as to cause the same to project either downwardly or upwardly from the side members of the frame, the first of these positions being indicated in Figs. 1, 2 and 4, while the latter position is shown in Fig. 3. These L-shaped brackets are also provided with bearings, indicated at 11′, for a driven shaft 12 of the harvester upon which the device is mounted for operation. The driven shaft 12 may constitute a portion of the binding mechanism, or any other conveniently located driven shaft may be selected for the attachment of the device.

The side members 1, 1 of the device are provided near their inner ends with upwardly extending brackets 13 affording bearings for a rock shaft 14 carrying a plurality of arms 15 which extend outwardly above the endless carrier so as to rest by gravity upon the latter or upon material that is being conveyed thereby for the purpose of maintaining such material in position and preventing the same from being displaced by the wind or from other causes. The side members 1, 1 are also connected adjacent to their outer ends by means of bails 16 and 17. The former of these bails is secured rigidly in position by means of bolts 18. The bail 17 is pivotally secured by means of bolts or pivot members 19 about which the said bail may swing from an upright to approximately horizontal position, as shown in Figs. 1 and 2. The bail 17 is connected with the bail 16 by means of a piece of canvas or other flexible material constituting a hood 20 which is found extremely useful when windy conditions prevail. Connected with the bail 16 is one end of a hoisting rope 21 which is preferably guided over a suitably arranged pulley 22 to some suitable point of attachment. In this manner, the device may be adjusted vertically, as will be readily understood.

From the foregoing description, taken in connection with the drawings hereto annexed, it will be readily seen that I have provided a simple and efficient carrying attachment which may be readily applied to a harvester or binder of ordinary construction for the purpose of conveying either headed or bundled grain to a receptacle such as the box of a wagon traveling alongside of the harvester.

Having thus described the invention, what is claimed as new, is:—

A conveying attachment consisting of a frame comprising suitably connected side members, roller carrying shafts journaled in said frame, an endless conveyer guided over the rollers, and L-shaped brackets reversibly connected with the side members and having bearings adapted to engage a driven shaft.

In testimony whereof I affix my signature in presence of two witnesses.

WARREN MOORE.

Witnesses:
W. B. ABRAHAMSON,
VERNE MAGNUSON.

---

Copies of this patent may be obtained for five cents each, by addressing the "Commissioner of Patents, Washington, D. C."